Patented Jan. 2, 1934

1,942,364

UNITED STATES PATENT OFFICE 1,942,364

WELDING ELECTRODE

Arnold C. Rood, Boston, Mass., assignor to Una Welding & Bonding Company, Cleveland, Ohio, a corporation of Delaware No Drawing. Application June 1, 1926, Serial No. 113,098. Renewed May 9, 1933

17 Claims. (Cl. 219—8)

This invention relates to the art of electric arc welding and more particularly to electrodes for use in such art.

In building up worn metal articles, or in joining metals, it is frequently desirable that the built up or joining metal be of substantially the same composition as the base metal or metals being built up or joined and have substantially the same physical properties as such base metal or metals, as regards, for example, tensile strength, ductility, resistance to wear, hardness, or the like. In performing such operations by the electric arc process, it is desirable that the electrodes used therefor have good flowing properties and that the weld metal produced be of solid homogeneous structure.

In the past, in producing weld metal of relatively high carbon content, high carbon steel electrodes have commonly been employed. Such electrodes, however, ordinarily have very poor flowing properties, the arc being extremely unstable during welding, and sputtering thereof being frequent. Also a great deal of the carbon of the original welding rod is burned out by the action of the arc. Moreover, it has often been extremely difficult, even with highly skilled welders, to obtain non-porous weld metal from such electrodes. Furthermore, with high carbon steel electrodes it is not ordinarily possible to produce even a passable grade of weld metal except by forming beads of large cross-section, which feature is frequently undesirable.

Electrodes coated merely with carbon to increase the carbon content of the weld have also proved unsatisfactory. Thus, where such a carbon coating has been of appreciable thickness the flowing properties have ordinarily been very poor, the weld metal has been porous and most of the carbon coating has been oxidized in the arc and hence has not entered the weld metal to increase the carbon content thereof.

In electric arc welding the weld metal ordinarily remains molten for but an extremely short time. Under the oxidizing influence of the arc atmosphere, the carbon in or associated with the usual steel electrode is partially or to a great degree oxidized to form carbon monoxide or carbon dioxide gas. Where the original percentage of carbon in or associated with the electrode is appreciable, for example, over 0.3%, the amount of carbon gases formed during welding is quite considerable, causing bubbling in the weld metal and instability of the arc, and when the weld metal solidifies, a large proportion of such gases is entrapped therein with resultant porosity. Furthermore, a large perecentage of the original percentage of carbon in or associated with the electrode is oxidized and does not enter or is not retained in the weld metal. For these and other reasons, it has in the past been very difficult to produce high carbon weld metal of good quality.

An object of this invention is to provide a welding electrode having good flowing properties and adapted to provide uniformly high quality weld metal of desired carbon content.

Another object of my invention is to provide a coated electrode for use in electric arc welding adapted to produce weld metal of non-porous, homogeneous, relatively high carbon steel.

A further object of my invention is to provide an electrode coating adapted to greatly improve the flowing properties of an electrode and to assist in producing non-porous homogeneous weld metal of predetermined chemical composition and of desired physical properties.

Other objects of the invention will be apparent to those skilled in the art from the description of it hereinafter given.

I have found that carbon may be readily introduced into meld metal without substantial formation of gaseous carbon compounds in the weld and without sputtering of the arc by associating with a metal electrode active deoxidizing material which will oxidize before the carbon so that when the electrode metal passes through the arc and while the weld metal is molten the active material is selectively oxidized and the carbon enters the weld metal without substantial loss due to the arc. Such suitable metallic deoxidizing material may include any one or more of a number of elements such as: titanium, vanadium, manganese, silicon, magnesium, zirconium, aluminum, etc. Preferably one or more of the very active deoxidizers, such as titanium, vanadium or zirconium, is present; and one or more of the less active deoxidizers, such as manganese or silicon, may be employed therewith. Much less carbon is burned out during the welding operation when one or more of the very active deoxidizers mentioned above is associated with the electrode. Such deoxidizing elements may be employed in a suitable commercial form such as in the elemental state or as a ferro or other alloy, such as, for example, ferro-titanium or ferro-vanadium. It has been found desirable that the deoxidizing materials employed include at least one of an exceedingly active nature, such as, for example, of the type represented by titanium, vanadium, or the like.

The deoxidizing material may be effectively introduced into the weld metal, in combination with the carbon, in a number of different ways. Thus, for example, the carbon may be present in the electrode in alloyed form, such as in the case of a high carbon steel electrode, and the deoxidizing material may be associated as a coating on said electrode. The deoxidizing material may also be associated in alloyed form in the steel electrode and the carbon to be incorporated into the weld may be disposed as a coating on said electrode. Or, both carbon and deoxidizing material may be associated in a ferrous electrode in alloyed form. Or, as may perhaps be most convenient, both the deoxidizing material and carbon may be disposed on the electrode as a coating, in which latter case, of course, part of the carbon may also be present in the steel of the electrode. It will be understood, of course, that any combination of the methods outlined above may be employed to cooperatively associate carbon and active deoxidizing material for arc welding.

Where deoxidizing material and carbon are associated in a coating on a ferrous rod, the said rod may be of any suitable carbon content. Thus, for example, in certain cases the rod may be of low carbon steel containing 0.1% carbon or less, and the carbon content may vary from the above mentioned percentage to 1.0% carbon or more. Ordinarily, mild steel rods may be preferred for electrodes of my invention due to the inherently better welding properties of low carbon steel. However, it will be understood that the flowing properties of medium or high carbon steel rods are greatly improved by a coating contemplated by my invention. The actual amount of carbon present in the coating is dependent on the carbon content desired in the weld and on the carbon content of the steel rod. The amount of deoxidizing material present in the coating is dependent on the amount of carbon in the coating and in the rod and should be sufficient in amount so that said material may be selectively deoxidized and that the carbon in substantially the entire amount may enter the weld metal. Preferably, however, the active deoxidizing material should not be present in great excess of that required for such selective deoxidation. With a rod of given composition, therefore, and with a coating of given composition, the carbon content of the weld metal will depend directly on the thickness of the coating. To further modify or improve the flowing properties of the electrode, fluxing material of suitable kind may be incorporated in the coating, together with the carbon and deoxidizing material. Thus, for example, carbonates, such as calcium carbonate and the like, and refractories, such as alundum or similar material, may, if desired, be included in the coating, though it is to be understood that such fluxing material may be entirely omitted and the benefits of my invention still be realized.

To prevent the rusting of the surface of the rod after coating and before the electrode is used and to prevent the removal of the coating before use due to such rusting, a rust-proofing material may be disposed on the surface of the metal rod before coating. One convenient method of rust-proofing the rod is to dip the rods in a solution of rust-proof varnish diluted with turpentine to form a very thin coating of protective material.

The advantages of my invention may best be realized by the use of the most suitable materials. Thus, the rod is preferably of a good grade of steel substantially free from non-metallic inclusions, dissolved oxides and included gases. The carbon content may be of any desired amount, but I have found it convenient for commercial practice to employ steel of less than 0.3% carbon, partly on account of the generally better welding properties of such low carbon steels. The surface of the rod before coating is preferably clean and free from any loosely adherent material and may, if desired, be rust-proofed.

The carbon in the coating may be of any suitable kind, crystalline or amorphous. Coke flour has been found very suitable as a coating constituent. Preferably, the carbon, such as coke flour, is in very finely divided form, such as 80 mesh or finer.

The deoxidizing material may be employed in the form of suitable alloys, or in the elemental or combined state. Thus, for example, it has been found convenient to employ titanium in the form of a ferroalloy containing approximately 25% titanium. Vanadium has been very satisfactorily employed in the form of a ferroalloy containing approximately 35% vanadium. Manganese may be employed, for example, in the form of a ferroalloy containing about 80% manganese. Other forms of the above materials may, of course, be employed, as well as other deoxidizing material of suitable properties. Preferably the deoxidizing material is in finely divided form, such as 80 mesh or finer.

If fluxing material is employed in the coating, such material is preferably in a finely divided or pulverized form. As previously mentioned, any suitable material may be employed for this purpose, such as, for example, calcium carbonate, and alundum.

The coating materials may be maintained in cooperative relation to the metal rod by any suitable binding material, such as, for example, an aqueous solution of silicate of soda. Thus a binder comprising one part by volume of commercial silicate of soda and two parts by volume of water has been found very satisfactory.

The coating materials may be applied to a welding rod in any suitable manner, such as by dipping said rod in a suspension of said materials or by painting said materials on the rod. The constituents may, of course, be applied to the rod in one or more coatings and, if desired, successive coatings may each contain certain of the materials. One convenient method of applying the coating constituents to a metal rod, however, is to form a suspension of all the coating materials and the binder, and to dip said rods in said suspension, forming the desired thickness of coating by one dipping operation.

As a specific example of a method of carrying out my invention, a steel rod of open hearth manufacture and of the following composition was used for coating:

| | Per cent |
|---|---|
| Carbon | 0.09 |
| Manganese | 0.37 |

The solid coating constituents comprised the following:

| Material | Composition | Mesh | Weight (%) |
|---|---|---|---|
| Manganese | 80% Mn | 200 | 15 |
| Ferro-titanium | 25% Ti | 200 | 20 |
| Ferro-vanadium | 35% V | 200 | 2 |
| Alundum | Commercial | Powder | 3 |
| Calcium carbonate | Commercial | Powder | 5 |
| Carbon (coke flour) | Commercial | 100 | 55 |
| | | | 100 |

A suspension was formed from the above coating constituents by the use of a silicate solution containing one part by volume of commercial silicate of soda to two parts by volume of water. Approximately 45 parts by weight of silicate solution to 55 parts by weight of solid coating material was used to make up the coating suspension. A steel rod of the above composition 7/16" in diameter was dipped in the above suspension to form a uniform coating 0.0045" in thickness. After the above coating was dry the electrode was employed to deposit metal on a portion of steel rail. A dynamotor supplying direct current at about 145 amperes was employed as a source of electric energy, the electrode being connected as the negative terminal. It may be mentioned that such an electrode may be connected as either the positive or negative terminal with entirely satisfactory results. The flowing properties of the electrode during the welding operation were exceptionally good and were such that very little skill was required to form a smooth, even bead of deposited metal of desired shape and size, free from porosity. The length of the arc maintained during the operation was approximately 1/4" on the average.

The metal formed by the welding operation was homogeneous and substantially non-porous and free from blow holes and had the following composition:

| | Per cent |
|---|---|
| Carbon | 0.538 |
| Manganese | 0.43 |

It may be noted that the deposited weld metal was of substantially the same hardness as that of the rail on which said weld metal was deposited, and the wearing properties of said weld metal approached that of the rail. The titanium and vanadium were substantially completely removed during the welding operation, though of course if an appreciable content of either of these constituents be desired in the resulting weld metal, an excess thereof may be provided in the electrode.

It is sometimes desirable to provide an appreciable excess of zirconium, vanadium or manganese over that required for deoxidizing purposes because such elements increase the hardness of the weld metal by forming the respective carbides. When titanium is utilized in combination with vanadium, zirconium or manganese, the titanium, being a powerful deoxidizing agent, is oxidized first so that if an excess of a mixture is utilized, the vanadium, zirconium or manganese, or a mixture of the two or all three of them, would enter the weld metal and form carbides. For example, if a mixture of ferro-titanium, ferro-manganese and ferro-vanadium, as set forth in the specific example in the specification, is utilized in excess, a portion of the vanadium and manganese will form carbides and be deposited in the weld metal.

It will thus be seen that I have provided a welding electrode for use in electric arc welding having excellent flowing properties and adapted to produce weld metal of desired chemical composition and physical properties and of uniform, homogeneous and substantially non-porous structure.

To those skilled in the art many modifications of and widely different embodiments and applications of my invention will suggest themselves, without departing from the spirit and scope thereof. My disclosures and the descriptions herein are purely illustrative and are not intended to be in any sense limiting.

What I claim is:

1. The method of forming weld metal of desired carbon content by means of the electric arc which comprises melting the metal of a welding rod in an electric arc, introducing into said molten metal, carbon and deoxidizing material of a group comprising titanium, vanadium and zirconium having a greater affinity for oxygen than carbon to thereby prevent substantial formation of gaseous carbon compounds within said molten metal and to prevent substantial sputtering and instability of said arc, and permitting said molten metal to solidify to form homogeneous, uniform weld metal of the desired carbon content substantially free from blow holes and porosity.

2. The method of forming solid homogeneous weld metal of desired carbon content, which comprises melting relatively low carbon steel in an electric arc, introducing into said molten metal sufficient carbon to increase the carbon content of said molten metal to the desired composition, introducing into said molten weld metal simultaneously with said carbon sufficient active deoxidizing material of a group comprising titanium, vanadium, and zirconium to prevent oxidation and gasification of the carbon within said molten metal, and permitting said molten metal to solidify to form a mass of solid homogeneous weld metal of the desired carbon content.

3. The method of forming steel weld metal of desired carbon content, which comprises associating with a steel welding rod carbon in sufficient amount to raise the carbon content of the steel to the desired composition, together with active deoxidizing material of a group comprising titanium, vanadium and zirconium in sufficient amount substantially to prevent gasification of said carbon in the molten weld metal subsequently to be formed but not substantially in excess of such amount, fusing said welding rod progressively in an electric arc and permitting said fused metal to solidify progressively, whereby solid homogeneous weld metal of the desired carbon content may be formed.

4. The method of forming weld metal of the desired carbon content, which comprises disposing on a steel welding rod containing less than the desired carbon content a coating comprising sufficient carbon to raise the carbon content to the desired composition together with active deoxidizing material of a group comprising titanium, vanadium and zirconium sufficient in amount to prevent gasification of said carbon in the molten weld metal subsequently to be formed but not substantially in excess of such amount, securing said coating to said rod with a binder, drawing an arc between said rod as an electrode, and the work upon which the weld metal is to be deposited, progressively melting the metal of said rod, and permitting said molten weld metal progressively to solidify, whereby solid homogeneous weld metal of the desired carbon content may be formed.

5. A coating composition for use with a welding electrode to form weld metal of desired carbon content, said composition comprising in parts by weight about 55 parts carbon, about 20 parts ferro-titanium, about 2 parts ferro-vanadium, and about 15 parts manganese, all of said constituents being in comminuted form.

6. The method of forming steel weld metal of desired carbon content, which comprises melting a steel rod in an electric arc and permitting said molten weld metal to solidify substantially immediately after being melted, introducing carbon into the weld metal while it is molten, and simultaneously introducing into the weld metal deoxidizing material of a group comprising titanium, vanadium and zirconium having a greater affinity for oxygen than carbon has, whereby substantially during the brief period that the weld metal is molten the deoxidizing material will be oxidized in preference to the carbon, thereby minimizing the amount of carbon oxidized from the molten weld metal.

7. The method of forming weld metal of the desired carbon content which comprises melting ferrous metal in an electric arc, introducing into said molten metal sufficient carbon to increase the carbon content of said molten metal to the desired composition, introducing into said molten weld metal simultaneously with said carbon active deoxidizing material of a group comprising titanium, vanadium and zirconium and additional deoxidizing material of a group comprising manganese and silicon, the total of said deoxidizing material being sufficient in amount to prevent oxidation and gasification of the carbon within said molten metal, and permitting said molten metal to solidify.

8. A welding electrode for building up surfaces of joining metals containing carbon, comprising, in combination, a steel rod and a coating disposed substantially uniformly on said rod, said coating comprising carbon in an amount sufficient to provide weld metal of approximately the same hardness as the metal to be built up or welded, and one or more active deoxidizing agents also associated with said rod, said deoxidizing agents being selected from a group consisting of titanium, vanadium and zirconium and their ferrous alloys, and being sufficient in amount to substantially prevent the gasification of carbon in the molten weld metal but not substantially in excess of that amount, whereby weld metal of the desired carbon content may be formed.

9. A welding electrode for building up surfaces or for joining metals containing carbon, comprising, in combination, a steel rod and a coating disposed substantially uniformly on said rod, said coating comprising carbon in sufficient amount to provide weld metal having approximately the same hardness as the metal to be built up or welded, and an active deoxidizing agent selected from a group consisting of titanium and vanadium and their ferrous alloys, said deoxidizing agent being sufficient in amount to substantially prevent gasification of said carbon in the molten weld metal but not substantially in excess of that amount.

10. A coating mixture for a steel electrode utilized in building up surfaces or joining metals containing carbon comprising an aqueous suspension of silicate of soda containing comminuted carbon in the form of coke flour, together with one or more active deoxidizing agents selected from a group consisting of titanium, vanadium and zirconium, and their ferrous alloys, the proportion of carbon being such that when the mixture is applied as a coating to a steel welding electrode, the carbon will be present in sufficient amount to provide weld metal of approximately the same hardness as the metal to be welded and the proportion of deoxidizing agents to coke flour being substantially sufficient to prevent gasification of the carbon in the molten weld metal during the welding operation, but not substantially in excess of that amount.

11. A welding electrode for building up surfaces or welding of metal containing carbon, comprising, in combination, a steel rod and a coating disposed substantially uniformly on said rod, said coating comprising carbon in sufficient amount to provide weld metal having substantially the same hardness as the metal to be welded, and titanium in elementary or alloy form in approximately sufficient amount to prevent gasification of the carbon in the molten weld metal.

12. A welding electrode for building up surfaces or joining metals containing carbon, comprising, in combination, a steel rod containing carbon in appreciable amounts but less than .3% and a coating disposed on said rod comprising carbon and titanium, said titanium being in the elementary or alloy form, the amount of carbon in the coating being sufficient to form a weld metal of high carbon steel and the amount of titanium being sufficient to prevent the oxidation of the carbon in the molten weld metal.

13. A welding electrode for building up surfaces or joining metals containing carbon, comprising, in combination, a steel rod and a coating disposed on said rod, said coating comprising carbon in sufficient amount to provide weld metal having substantially the same hardness as the metal to be welded, titanium, and an additional metal that is capable of forming carbides which increase the hardness of the weld metal, said titanium and additional metal being present in sufficient amount to prevent oxidation of the carbon and to provide an appreciable excess of the additional metal to increase the hardness of the weld metal.

14. A welding electrode for building up surfaces or joining metal containing carbon, comprising, in combination, a steel rod and a coating disposed substantially uniformly on said rod, said coating comprising carbon in sufficient amount to provide weld metal having substantially the same hardness as the metal to be welded and a mixture of titanium and vanadium or their ferrous alloys, said titanium and vanadium being present in at least sufficient amounts to prevent oxidation of the carbon and to provide an appreciable excess of the vanadium to increase the hardness of the weld metal.

15. A welding electrode for building up surfaces or joining metals containing carbon, comprising, in combination, a steel rod, a coating disposed on said rod comprising carbon in sufficient amount to provide weld metal having substantially the same hardness as the metal to be welded, titanium and one or more additional deoxidizing metals selected from a group consisting of zirconium, vanadium and manganese, the titanium and additional deoxidizing agent being present in sufficient amount to substantially prevent the oxidation of the carbon and to provide an appreciable excess of the additional metal to increase the hardness of the weld metal.

16. A welding electrode for building up surfaces or joining metals containing carbon, comprising, in combination, a steel rod containing carbon in appreciable amounts but less than .3% and a coating disposed on said rod comprising carbon in sufficient amount to provide a weld metal having substantially the same hardness as the metal to be welded, titanium in elementary or alloy form and one or more additional elements which are capable of forming carbides which increase the hardness of the weld metal, said titanium and additional metal being present in sufficient amount to prevent oxidation of the carbon and to provide an appreciable excess of the additional metal to increase the hardness of the weld metal.

17. A welding electrode for building up surfaces or joining metals containing carbon, comprising, in combination, a steel rod containing carbon in appreciable amounts but less than .3% and a coating disposed on said rod comprising carbon in sufficient amount to provide a weld metal having the same hardness as the metal to be welded, titanium in elementary or alloy form and one or more additional elements selected from a group consisting of vanadium, zirconium and manganese, said titanium and the additional ingredient being present in sufficient amount to prevent substantial oxidation of the carbon and to provide an appreciable excess of the additional metal to increase the hardness of the weld metal, said coating also containing one or more fluxing ingredients.

ARNOLD C. ROOD.